Nov. 18, 1947.                E. E. WALLACE                2,430,898
            RETRACTABLE LANDING GEAR FOR AMPHIBIAN AIRPLANES
                    Filed Aug. 3, 1944          8 Sheets-Sheet 1

Inventor
Edward E. Wallace
By Geo. B. Pitts
attorney

Patented Nov. 18, 1947

2,430,898

UNITED STATES PATENT OFFICE 2,430,898

RETRACTABLE LANDING GEAR FOR AMPHIBIAN AIRPLANES

Edward E. Wallace, Cleveland Heights, Ohio

Application August 3, 1944, Serial No. 547,870

8 Claims. (Cl. 244—101)

This invention relates to an airplane, more particularly to the construction and mounting of the landing gears therefor and the mechanism for operating them. The construction herein disclosed is adapted for embodiment in various types of airplanes, but for illustrative purposes, I have shown a portion of an airplane of the type and size disclosed in my co-pending application Ser. No. 431,102, filed February 16, 1942, now matured into Patent 2,415,615.

One object of the invention is to provide an improved airplane having landing gears retractible into the wing structures thereof and simplified power means for operating the gears to and from their landing position.

Another object of the invention is to construct an improved airplane the wing structures of which enclose retractible landing gears, the retractile mechanism for each gear when it is in operative position, providing spaced, fixedly related supports and compression devices between the axle of its landing wheel and these supports to permit relative movement between the wing structure and wheel longitudinally and laterally of the latter during landing.

Another object of the invention is to provide an improved airplane of the amphibion type having landing gears retractible into the sponsons thereof and power means for operating the landing gears to and from their landing position, and wherein provision is made to house the gears and their operating power means.

Another object of the invention is to provide an improved airplane having landing gears retractible into the wing structures and power means between the landing gears for operating them arranged to occupy minimum space in the fuselage and wing structures.

Other objects of the invention will be apparent to those skilled in the art to which my invention relates from the following description taken in connection with the accompanying drawings, wherein

Fig. 1a is a fragmentary section on the line 1a—1a of Fig. 1;

Fig. 2 is a section on the line 2—2 of Fig. 1;

Fig. 4a is a fragmentary section on the line 4a—4a of Fig. 2;

Fig. 4b is a section on the line 4b—4b of Fig. 4a;

Figures 1, 6, 6A:
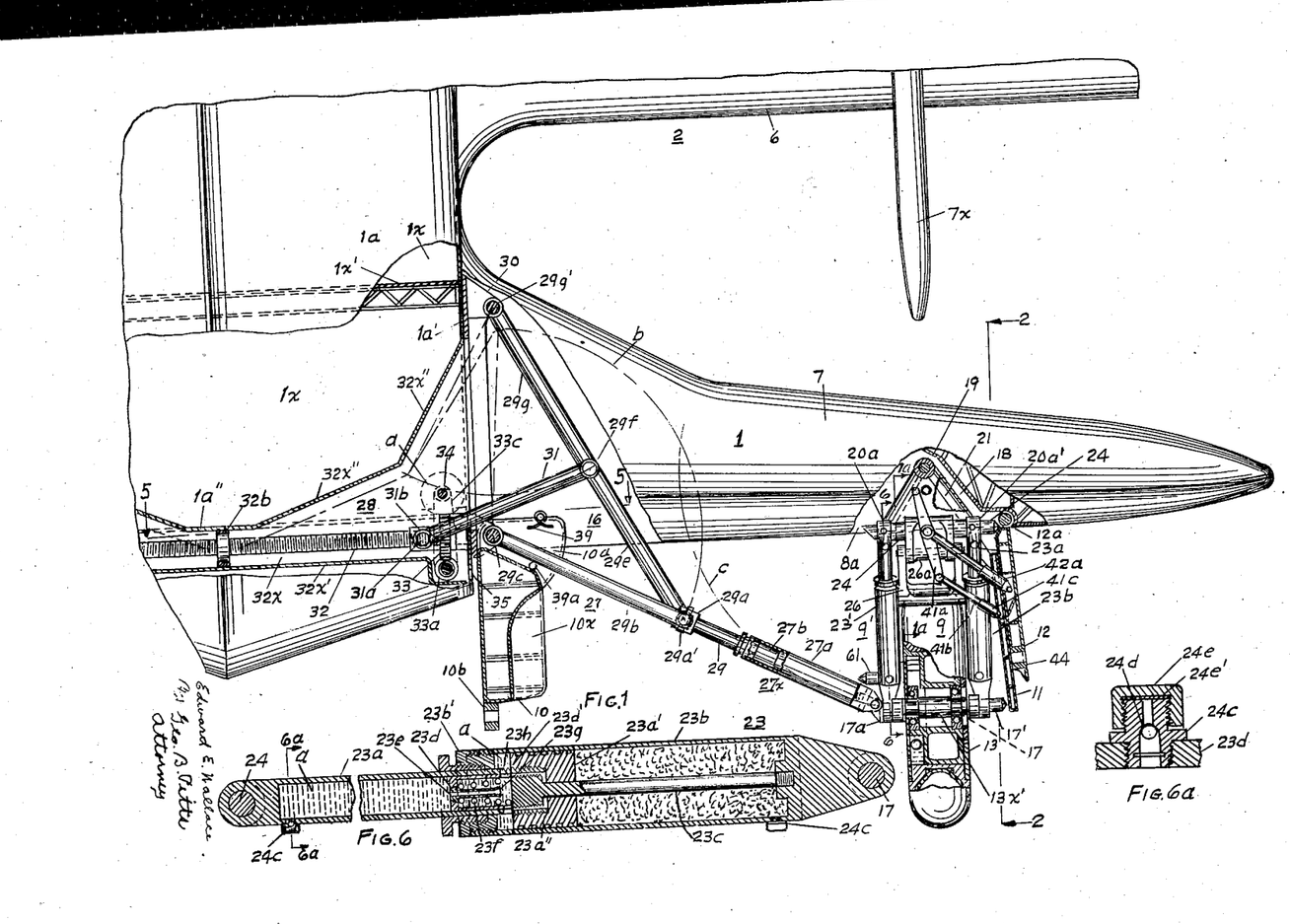
Fig. 1 is a fragmentary view showing partly in front elevation and partly in section, a portion of an airplane embodying my invention.
Fig. 6 is a section on the line 6—6 of Fig. 1.
Fig. 6a is a fragmentary section on the line 6a—6a of Fig. 6.
Figure 3:
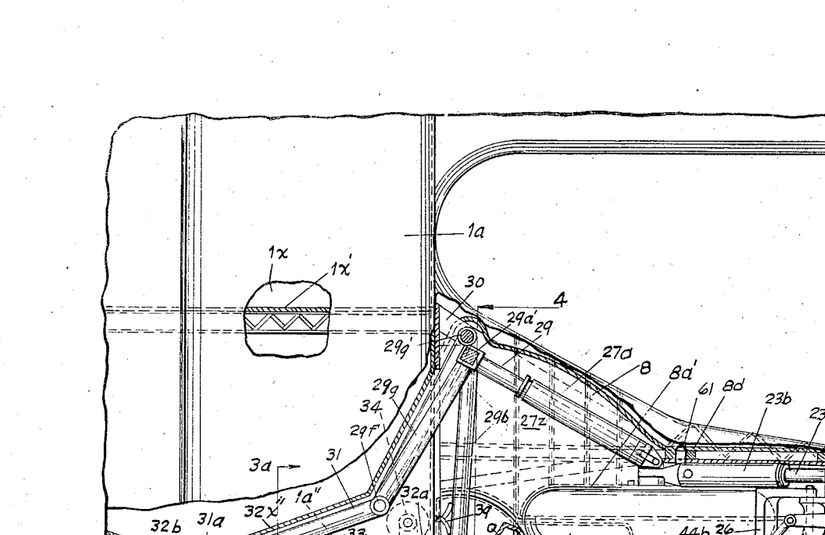
Fig. 3 is a view similar to Fig. 1, with the walls of the fuselage and sponson broken away to show the landing gear in retracted position and the power mechanism therefor.
Figures 3A, 5:
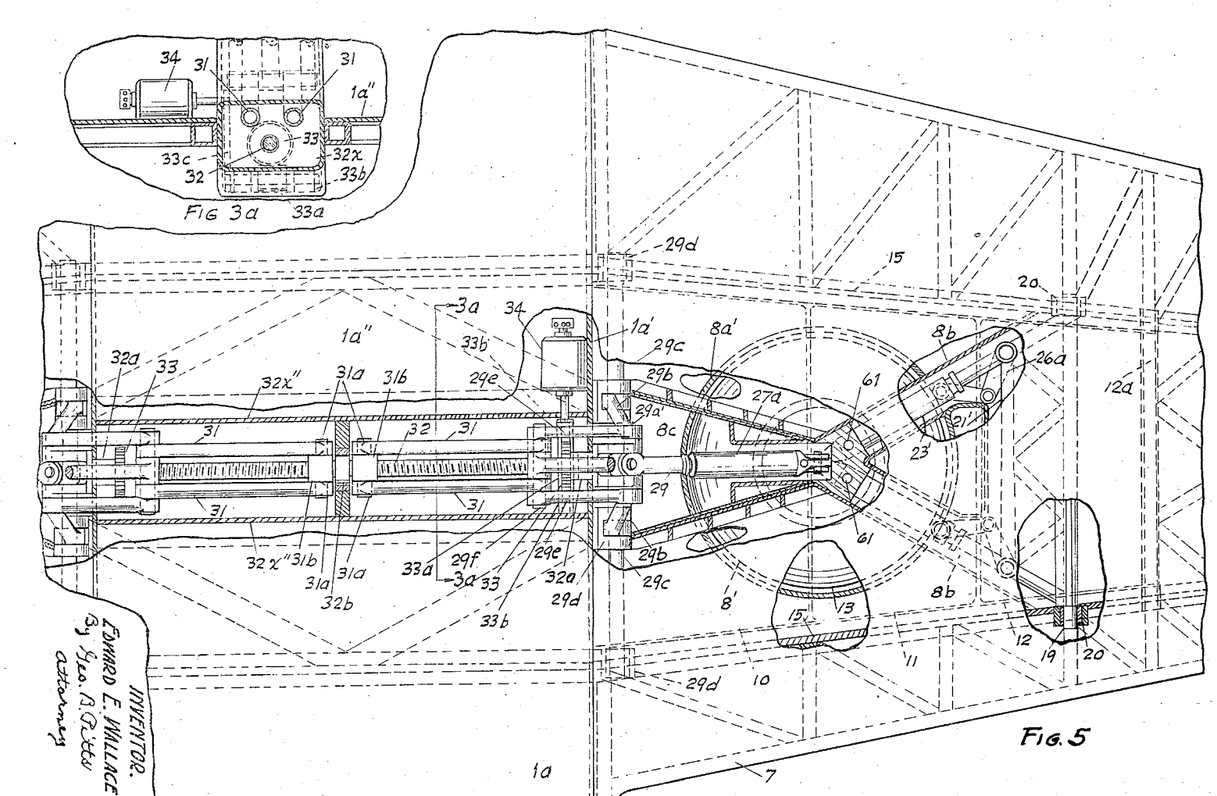
Fig. 3a is a section on the line 3a—3a of Fig. 5.
Fig. 5 is a bottom plan view of parts shown in Figs. 1, 2 and 3, partly in section on the line 5—5 of Fig. 1.

In the drawings, 1 indicates as an entirety an airplane having a fuselage 1a and wing structures 2, preferably of the construction shown in my aforesaid application, wherein the wing structures consist of airfoils 6 and sponsons 7. Due to the fact that these structural members and the landing gears at opposite sides of the fuselage 1a are similar in construction, the illustrations in the drawings have been restricted to a portion of the plane, including a portion of the fuselage, airfoil and a propeller 1x, as the engine for the latter is mounted on the adjacent airfoil 6. Accordingly, reference will be made to only one of these members. As shown in Fig. 1, the fuselage 1a provides payload spaces 1x having upper and lower floors 1x', 1a''. The exterior walls of the fuselage 1a, airfoil 6 and sponson 7 are formed of suitable sheet material with suitable truss, bracing and reinforcement elements, certain of which are shown and will be referred to; these elements for the sponson 7 being arranged to provide for a chamber or compartment 8, which receives and completely encloses the adjacent landing gear, indicated as an entirety at 9 (as shown in Figs. 3 and 5). As illustrated, the side and bottom walls of the compartment 8 are suitably supported within the adjacent sponson 7 in relation to an opening 8a provided in the bottom wall thereof, whereby the landing gear 9 may be swung to an operative position (see Figs. 1 and 2)

when the airplane is to take off from or land on land.

When the airplane is in flight, the landing gears 9 may be and preferably are retracted into the compartments 8 to eliminate parasite drag; they also occupy this position when landing and maneuvering on and taking off from water. Doors 10, 11 and 12 (later referred to) are provided for closing and substantially sealing the compartment 8 after the adjacent landing gear is moved thereinto. The walls of the compartment 8 and the inner walls of the doors are preferably shaped to closely fit the adjacent landing gear 9, including its swinging devices, as later set forth, so that a minimum space in the compartment around the landing gear exists for any water which may leak through or between the joints for the doors 10, 11 and 12 or between the latter and the side walls of the opening 8a.

The walls of the compartment 8 are suitably connected to the spars of the adjacent sponson and walls of the latter and fuselage so as to prevent leakage of water from the compartment into the sponson or fuselage, in the event water leaks into the compartment through the joint of its closures.

Each landing gear 9 comprises a wheel 13 (preferably of the pneumatic type), a mounting indicated as an entirety at 9' for the wheel swingably mounted at its inner end on and between spaced spars 15 within and extending longitudinally of the adjacent sponson 7 and an operating mechanism, indicated as an entirety at 16, for swinging the mounting 9' in either direction, such mechanism also, by preference serving to operate the doors 10, 11 and 12, so as to automatically close the opening 8a when the landing gear 9 is moved into the adjacent compartment 8 and to automatically open the doors when the landing gear is moved to its operative position.

Figures 1A, 2, 4A, 4B:
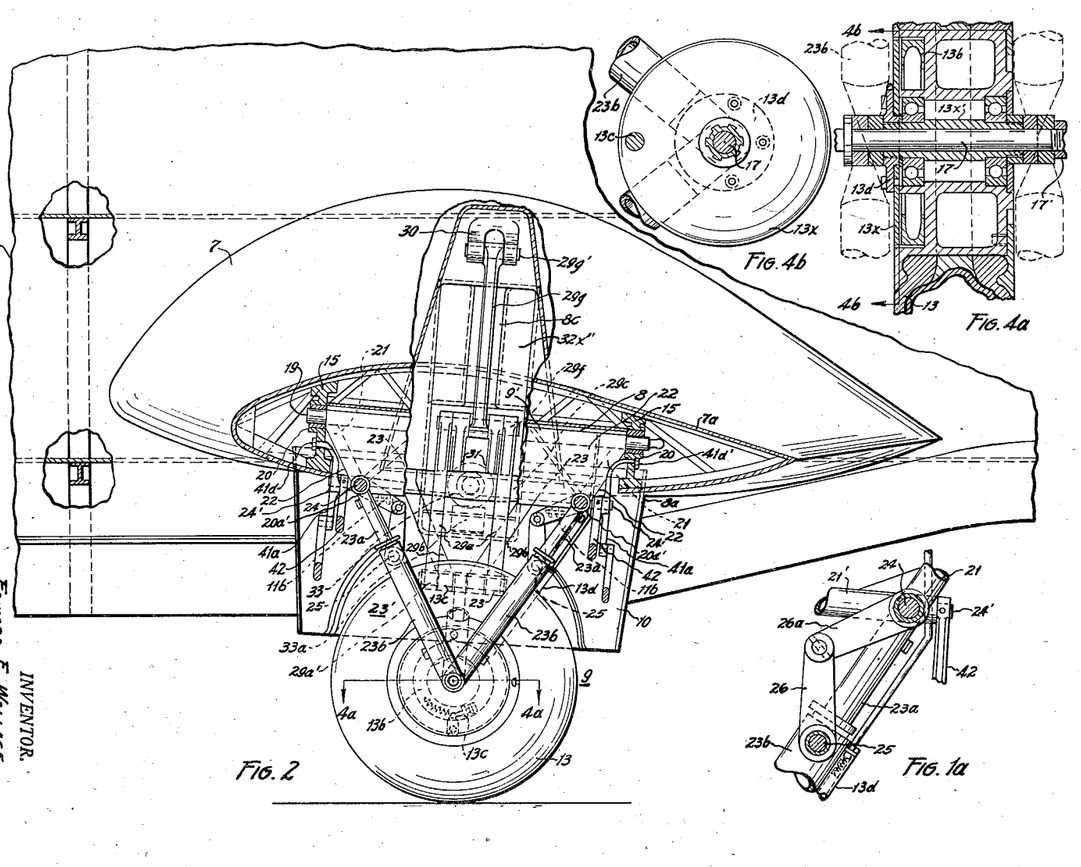

The wheel 13 is provided with a hub which rotates on a sleeve 13x' (suitable anti-friction bearings being provided between the hub and sleeve as shown in Figs. 1 and 4a), the sleeve being mounted on a shaft 17.

The opposite ends of the axle 17 are secured to the lower end of the mounting 9'. Of the mounting 9', 18 indicates an elongated truss-like member consisting of (a) a hollow bar or tube 19, the opposite ends of which rotatably fit bushings 20 suitably mounted in the spars 15 (see Fig. 2), to swingably mount the mounting 9' on the adjacent sponson 7, (b) pairs of diverging hollow bars or tubes 21 (see Fig. 1), extending from the opposite outer end portions of the bar 19 in a direction inclined toward each other and (c) a hollow bar or tube 21' extending between and connected to each bar 21 of one pair of bars and the corresponding bar 21 of the other pair thereof. Plates 22 are secured (as by welding) to the bars 19, 21 and 21' on the opposite lateral sides of the member 18 and to the outer sides of each pair of bars 21 at the opposite ends of said member, and a plate 23 is secured (as by welding) to the bars 21' and 21 and plates 22, these plates serving to sealingly close the space within the truss member 18 so as to reduce the water holding capacity of the adjacent compartment 8. The outer ends of each pair of bars 21' terminate in alined knuckles 20a, 20a', in which is mounted a cross pin 24. Each pin 24 is fixedly secured, in any well known manner, to either one or both of the adjacent knuckles 20a, 20a', to prevent its rotation. 23' indicates pairs of supporting members at opposite sides of the wheel 13 and connecting the opposite ends of the axle 17 to the truss member 18. Each supporting member 23' consists of a plunger 23a, having on its inner end a piston 23a' (see Fig. 6) and a cylinder 23b into which the plunger telescopes. Each cylinder 23b is filled with air under pressure below the piston and oil under pressure above the piston (for example, air at approximately 500 lb. initial pressure per square inch and oil under the same pressure as later set forth) to cushion the inward movement of the plunger. Also each plunger 23a is hollow and filled with oil having a pressure of approximately 500 lbs. per square inch. Each plunger 23a and each cylinder 23b is provided with a valved device, whereby it may be filled with the fluid. Each device is similar in construction and similarly mounted. For example, the side wall of the cylinder is formed with a screw threaded opening in which is mounted the inner threaded end of a nipple 24c (see Fig. 6a), through which the cylinder may be charged with air (see Fig. 6). The bore through the nipple is shaped to form a seat for a valve 24d (see Fig. 6a). The outer end of the nipple 24c is externally threaded to receive a removable screw cap 24e, which may be tightened against a gasket 24e, which may be tightened against a gasket 24e' to seal the nipple. The outer end of each plunger 23a is pivotally mounted on the end portion of the adjacent pin 24, whereas the outer end of each cylinder 23b is pivotally connected to the adjacent end portion of the axle 17. The outer ends of the cylinders on the inner side of the wheel 13 are disposed between the adjacent side wall 13x of the wheel 13 and a shoulder 17a on the adjacent end of the axle 17 and the outer ends of the cylinders on the outer side of the wheel 13 are disposed between the sleeve 13x' on the axle 17 and the inner end of a cap 17', which has screw threaded engagement with the adjacent end of the axle 17, the cap being preferably pinned to the axle after the cylinders are mounted thereon. It will be observed that, due to the relative movements between the plungers 23a and their respective cylinders 23b and the pivotal connections of the plungers to the truss member 18 and pivotal connections of the cylinders to the axle 17, the mounting 9' provides for relative vertical movements between the wheel 13 with respect to the truss-member 18, as shown in Figs. 12, 12a, 12b, 13, 13a, 13b, 14, 14a, 14b and 15, whereas the pivotal connection of the mounting 9' with the spars 15 permits relative lateral movement of the airplane relative to the mounting and point of engagement of the wheel 13 with the ground, as shown in Figs. 11a, 12a, 12b, 13a, 13b, 14a, 14b and 15, in directions substantially at right angles to the adjacent sponson 7, whereby the wheel 13 yieldingly accommodates itself to forces which result in making a landing or maneuvering on land to insure safety and eliminate damages to the landing gear and airplane. Each supporting member 23' at one side of the wheel 13 is connected to the corresponding supporting member 23' on the opposite side of the wheel to insure simultaneous relative telescoping movement of the plungers and cylinders of these connected-together members. For this purpose, the cylinder 23b at each side of the wheel 13 is provided with an inwardly extending rod 25 alined with the rod 25 on the corresponding cylinder 23b at the opposite side of the wheel, and pivotally mounted on these rods 25 and the adjacent pin 24 is a pair of links 26, 26a, pivotally connected together at their inner ends (see Fig. 1a). As will be observed, as the rods 25 extend into the knuckle for the link 26, the related members 23' are tied together in fixed relation. As shown in Figs. 1 and 3, the knuckle for the link 26 has a width substantially equal to the spacing of the adjacent cylinders 23b, so as to engage therewith as the link rocks on the rods 25, and thus maintain the links centrally of the adjacent wheel 13. It will be observed that the supporting members 23' upon opposite sides of the wheel are disposed equal distances from an imaginary plane which cuts the trunnion or bar 19 and center of the wheel (the central plane extending at right angles to the axle 17), so that all forces against or transmitted through the wheel are always in line with the trunnion 19.

Each of the supporting members 23' is constructed to retard the movement of the plunger 23a outwardly of the adjacent cylinder 23b. For this purpose, the plunger 23a is of hollow construction (see Fig. 6) and filled with liquid, such as oil $a$ (under pressure as already set forth), which in the inward movement of the plunger and its piston, is forced into the cylinder 23b behind the piston 23a' and in the outward movement of the plunger and its piston, the latter forces the liquid through a restricted by-pass back into the plunger, the restricted return flow of the liquid serving to prevent a rapid rebound of the parts connected to the plunger 23a. The control of the liquid from the plunger 23a into the cylinder 23b and from the latter back into the plunger is provided for by the following devices: 23c indicates a rod axially supported in the cylinder 23b, its outer end being threaded into an opening formed in the outer end wall of the cylinder. The rod 23c extends through an opening formed in the piston 23a' and is provided at its inner end with a head to which is secured the outer end of a casing 23d. As shown in Fig. 6, the head on the rod 23c is externally threaded and the casing 23d is internally threaded, whereby these parts are adjustably connected together and the casing fixedly supported relative to the cylinder 23b. By preference the piston 23a' is formed with a recess 23a'', which accommodates the lower end of the casing 23d to permit a maximum stroke of the piston. The inner side wall of the recess 23a'' is provided with screw threads and the inner end of the plunger 23a is screw threaded to provide a connection therebetween. The inner wall of the cylinder 23b and adjacent its inner end is provided internally with screw threads for a closure 23b', which accommodates a suitable gland. As shown, when the parts are in normal position, a space is provided for a portion of the liquid $a$. The end wall of the casing 23d is provided with a normally closed escape valve 23e for the liquid $a$, so that in the inward movement of the plunger 23a, the pressure of the liquid $a$ therein will open the escape valve and permit the liquid to flow into the cylinder 23b, the casing 23d being formed with ports 23d' to permit such flow of the liquid. The valve element of the escape valve 23e is normally biased into engagement with its seat by a coiled spring 23f surrounding the shank of the valve element and abutting the head thereof and the inner end of the head on the rod 23c. As shown, the valve element of the escape valve 23e and its shank are formed with a through duct 23g which forms a restricted by-pass for the liquid $a$ in the return stroke of the piston 23a' to retard the movement of the plunger 23a. The duct 23g also permits flow of the liquid $a$ to and from the plunger 23a when the latter and the cylinder are in normal position to equalize the pressure therein, the side wall of the plunger 23a being formed with ports 23h above the piston 23a' to provide a communication between the plunger 23a and cylinder 23b. The oil $a$ is supplied to each plunger 23a through a nipple 24c (see Fig. 6) which is similar in construction to the nipple through which air is supplied to the cylinder 23b.

Figure 4:
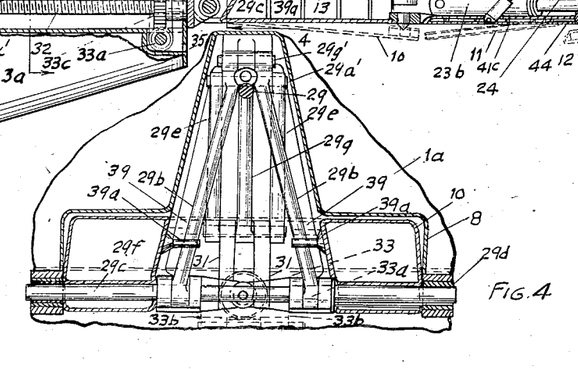
Fig. 4 is a section on the line 4—4 of Fig. 3.

The mechanism 16 for swinging each mounting 9' and the wheel 13 supported thereby from the adjacent compartment 8 to its operative position and in the reverse direction comprises a linkage 27 extending between and connected to the adjacent side wall 1a' of the fuselage 1a within each sponson 7 and the adjacent mounting 9' and power means 28 for operating the linkage. The linkage for operating the mounting 9' is arranged to and operates in a vertical plane co-incident with the axis of the axle 17 and at right angles to the shaft 19. The linkage 27 includes compression devices 27x between it and the wheel mounting 9', which devices consist of the following: 27a indicates a cylinder pivoted at its outer end by means of a universal joint on the inner end of the axle 17. 27b indicates a piston in the cylinder 27a carried on the outer end of a plunger 29. The plunger 29, piston 27b, cylinder 27a and by-pass for the oil are similar in construction to the plunger 23a, piston 23a', cylinder 23b and by-pass shown in Fig. 6, whereby inward thrusts on the adjacent wheel 13 are cushioned and rebound thereof retarded. The inner end of the rod 29 is pivotally connected by means of a universal joint 29a to the linkage 27, that is, to the outer ends of a pair of diverging rods 29b, 29b, forming elements thereof. The inner ends of the rods 29b are provided with knuckles which rotatably fit a shaft 29c (see Fig. 4). The opposite ends of the shaft 29c are mounted in bearings 29d suitably carried by the side wall 1a' of the fuselage 1a within the sponson 7. One element of the joint 29a consists of a pin 29a' on which pivot the outer ends of the rods 29b, 29b, and the outer ends of a pair of rods 29e. The inner ends of the rods 29e are connected by a pivot pin 29f to the inner end of a rod 29g, the outer end of which swings about a pivot pin or shaft 29g' which is mounted in hollow bosses on a bracket 30 suitably fixed to the side wall 1a' of the fuselage 1a within the sponson 7. The power means 28 comprise the following: 31 indicates a pair of spaced parallel thrust rods (see Fig. 5) pivotally mounted at their outer ends on the pin 29f at opposite sides of the rod 29g and pivotally connected at their inner ends to pins 31a on the opposite sides of a nut 31b, which is mounted on the screw threaded portion of a shaft 32. The opposite ends of the shaft 32 are mounted in suitable bearings 32a provided on the inner sides of the walls 1a' of the fuselage 1a. A bearing 32b is also, by preference, provided for the shaft 32 intermediate its ends. 33 indicates a worm gear fixed to the shaft 32 adjacent one of the bearings 32a and in mesh with a worm 33a, suitably mounted in bearings 33b. At one end, the shaft or shank of the worm 33a is provided with a sprocket to which power is transmitted by a chain 33c engaging a sprocket suitably fixed to the shaft of a motor 34. As will be understood, the motor 34 may be driven in either direction to rotate the shaft 32 in the desired direction to move the nut 31b outwardly or inwardly. As shown, the shaft 32 at one side of the bearing 32b is provided with right hand screw threads and at the opposite side of the bearing it is provided with left hand screw threads, so that by providing a nut 31b on each screw threaded portion and connecting it to the adjacent linkage 27, both landing gears 9 may be operated simultaneously to their operative positions or to their retracted position. When the landing gears 9 are in their retracted position (see Figs. 3 and 5), the nuts 31b are adjacent the bearings 32b, so that operation of the shaft 32 counter-clockwise (as viewed in Fig. 2) will move both nuts outwardly and effect outward movement of the rods 31, which in turn will swing the rods 29b, 29e, 29g, to the position shown in Fig. 1 (as indicated by the lines a, b, c), to set the gears 9 in landing position.

As shown in Figs. 1, 3, 3a and 5, the shaft 32 is mounted in a chamber 32x which extends transversely through the fuselage 1a and merges or communicates at its opposite ends with the compartments 8 in the sponsons 7 to accommodate portions of the linkage 27 and power means 28. By preference, the floor 1a'' is formed with an opening to accommodate the chamber 32x to mount the power means 28 in a plane below the lower floor 1a'' and the motor thereabove. The outer end walls of the chamber 32x are suitably connected to the walls of the fuselage to prevent intake of water into the latter. The chamber 32x consists of a bottom wall 32x' and the side and top walls 32x'' at each end thereof, the side walls converging upwardly (see Fig. 2) and the top wall being inclined upwardly and laterally, whereby the outer ends of these walls are connected to the walls 1a' and substantially register with the inner open ends of the compartments 8. Accordingly, when the doors for the compartments 8 are closed, danger of water entering the chamber 32x is eliminated, but whatever leakage takes place is free to drain out through openings 35 (one only being shown in Fig. 1) when the airplane takes off from the water.

The doors 10, 11 and 12 related to each sponson 7 are arranged to close the adjacent compartment 8 to facilitate landing on water and to prevent the intake of water when the sponsons are in engagement therewith. In closed position, the doors complete the bottom surface of the adjacent sponson to reduce parasite drag when the airplane is in flight or maneuvering on water. Due to the danger of intake of water around the edges of the doors when landing on water or the sponsons are in engagement therewith, I prefer to shape and relate the walls of each compartment 8 to closely fit over and around the wheel 13, its mounting 9' and the devices for operating the wheel and mounting into and from the compartment, whereby, when these parts are in retracted position and the doors 10, 11 and 12 are closed, minimum space exists within the compartment to receive and hold water. Therefore it will be seen that while the landing gears are carried in the sponsons and are operated at will to landing and take-off position, provision is made for excluding water from the sponsons when the landing gears are mounted in their respective compartments; furthermore, if intake of water takes place, the openings which permit such intake, will provide for drainage of the water as soon as the plane is in flight. The walls of each compartment are shaped to form a cavity or recess 8a fitting over the wheel 13 and its mounting, diverging recesses 8b for the inner side members 23' of the mounting 9' and a recess 8c for the linkage 27, whereas the inner wall of the door 10 is shaped, as shown at 10x, to take up the space below the wheel between its axle and the adjacent wall 1a' of the fuselage.

Each door 10 is interconnected to the adjacent linkage for moving the adjacent landing gear so as to move with the latter in either direction and the adjacent doors 11 and 12 are interconnected to the adjacent mounting 9' to swing therewith in either direction. These connections form the subject matter, in part, of applicant's co-pending application, for which reason no claim thereto is made herein.

Each door consists of inner and outer walls having suitable bracing and reinforcing elements between them.

As shown, the door 10 is mounted on the shaft 29c. Intermediate its side edges, the inner wall of the door 10 is shaped to form a recess 10a to accommodate the inner end of the rods 29b, which are pivotally mounted on the shaft 29c, as already set forth. One side wall of the recess 10a is provided with spaced abutments 39, 39a, disposed upon opposite sides of and in the path of movement of one of the rods 29b. Accordingly, when the power means are operated to operate the linkage 27 to move the landing gear outwardly, the rod will engage the abutment 39a and swing the door 10 to its open position (see Fig. 1) and when the linkage 27 is operated in the reverse direction the rod 29b will engage the abutment 39 to swing the door 10 with the landing gear. The abutment 39 preferably comprises a spring which is put under tension as the rods 29b complete their closing movement. The spring 39 permits the door 10 to move relative to the cylinder 27a when operated by an initial door operating means (not shown) set for and claimed in the aforesaid co-pending application. As shown in Fig. 1, the free end of the door 10, midway between its side edges, is provided with an extension 10b (the adjacent edges of the door 11 having a complementary recess to receive the extension 10b), in which is fixedly mounted a ring adapted to telescope over the cap 17' on the extended outer end of the wheel axle 17, in the final movement of the door 10 into closed position.

The door 11 is hingedly mounted on lugs 11b carried by the adjacent bar 21' of the truss member 18, whereas the door 12 is fixed to a shaft 12a mounted in bearings provided in the spars 15. The inner cylinders of the mounting 9' support pins 61 which fit into rings 8d, fixed to the wall of the compartment, whereas the door 12 is provided with rings 44 (only one being shown) which fit over the extended ends of the rods 24. When the doors are closed, these parts, including the connection of the door 10 with the cap 17', serve to resist tensile stresses on the lower side of the sponson and compression stresses on its upper side as set forth in my aforesaid co-pending application, for which reason no claim thereto is made herein.

The door 12 is connected to the mounting 9' by pairs of telescopically related members, each pair consisting of a pitman 42 pivotally mounted on a stud shaft 24' carried on the adjacent rod 24 and a cylinder 42a pivotally connected at its outer end on the door 12, the inner end of the pitman being provided with a head engaging a spring within the cylinder between the head and inner end of the cylinder. The door 11 is connected to each end of the mounting 9', each connection comprising a lever 41a pivoted intermediate its ends on the adjacent stud shaft 24' and a pair of telescopically related members 41b, 41c, having a compression spring between them, similar in construction to the members 42, 42a. The outer end of the cylinder 41c is pivotally connected to the door 11, whereas the outer end of the pitman 41b is pivotally connected to the outer end of the lever 41a. The opposite end of the lever 41a is arranged to engage a stop 41d carried by the wall of the compartment, whereby the door is moved away from the mounting 9' when the latter is moved to its operative position. No claim is made to these connections as they form the subject-matter of my aforementioned co-pending application.

Figs. 7 to 10, inclusive, illustrate a modified form of construction of the power means, indicated as an entirety at 28', and linkage, indicated as an entirety at 27' for operating the landing gears. In this form of construction, the power means 28' is located in a chamber 28x provided in the upper floor 1x' of the fuselage 1a and operates through linkage 27' directly on the mounting 9' to swing it in either direction. The landing gear and its mounting, and the compartment therefor in the sponson 7 and doors for the compartment are similar to like parts shown in Figs. 1 to 6, inclusive, so that a description of these parts need not be repeated. The linkage 27' is arranged to operate in a vertical plane coincident with the axle 17 and at right angles to the shaft 19. The linkage 27' consists of the following: 27a' indicates a cylinder having a universal joint connection with the inner end of the axle 17. 27b' indicates a piston in the cylinder 27a' carried on the outer end of a rod 29'. The cylinder 27a' and piston 27b' are similar in construction to the cylinder 27a and piston 27b. The inner end of the rod 29' is connected by a universal joint to a knuckle 43 in which is mounted a pin or shaft 45. The opposite ends of the shaft 45 extend through knuckles 45a provided on the outer ends of a pair of diverging links 45'. The inner ends of the links 45' are pivotally mounted on a shaft 29c' supported similarly to the shaft 29c. 46 indicates a link having at its outer end bifurcations mounted between the knuckle 43 and knuckles 45a and in alinement therewith on the shaft 45, whereby the link 46 has pivotal connection with the rod 29' and links 45'. The inner end of the link 46 is connected to one side of a nut 47 threaded on a feed screw 48, which forms one element of the power means 28', one feed screw 48 being provided for each landing gear. The feed screws 48 extend through the chamber 28x and each is mounted at its opposite ends in suitable bearings, the bearing for the outer end of each screw 48 being mounted in a bracket 48x' carried by the adjacent side wall 1a' and the bearing for the remote end of the feed screw being mounted in the other side wall 1a' of the fuselage. The power means 28' comprises the following: 49 indicates a motor of the gear reduction type supplied with electric current from a suitable source, the motor shaft being provided with a worm 49a in mesh with a gear 50. The gear 50 is fixed to the adjacent end of a shaft 51 supported at its opposite ends in suitable bearings 51a. The gear 50 is arranged adjacent one side wall 1a' and meshes with a gear 52 fixed to the feed screw 48 remote from the motor 49. 50a indicates a gear fixed to the shaft 51 adjacent the other side wall 1a and in mesh with a gear 52a fixed to the other feed screw 48. In this arrangement it will be observed that the driven shaft 51 is common to and drivingly connected to both screws 48 and that the latter are simultaneously driven to swing both landing gears into operative position or into their retracted position. Each of the feed screws 48 is formed with a collar 53 to limit the movement of the adjacent nut 47 when moving in the direction to swing the adjacent gear 9 into its compartment, the collar 53 being positioned to be engaged by the nut when the landing gear reaches the limit of its movement in the compartment therefor.

From the foregoing description it will be observed that the wheel 13 is flexibly mounted with respect to the shaft 19 about which it and its mounting swing and the linkage which is operated by the power means to swing the wheel and its mounting from either position, so that in making a landing stresses transmitted laterally inwardly, vertically, in the direction of travel and/or where two or more of these components of forces are combined into a resultant, are yieldingly resisted and undue re-bound of the airplane prevented.

Figure 7:
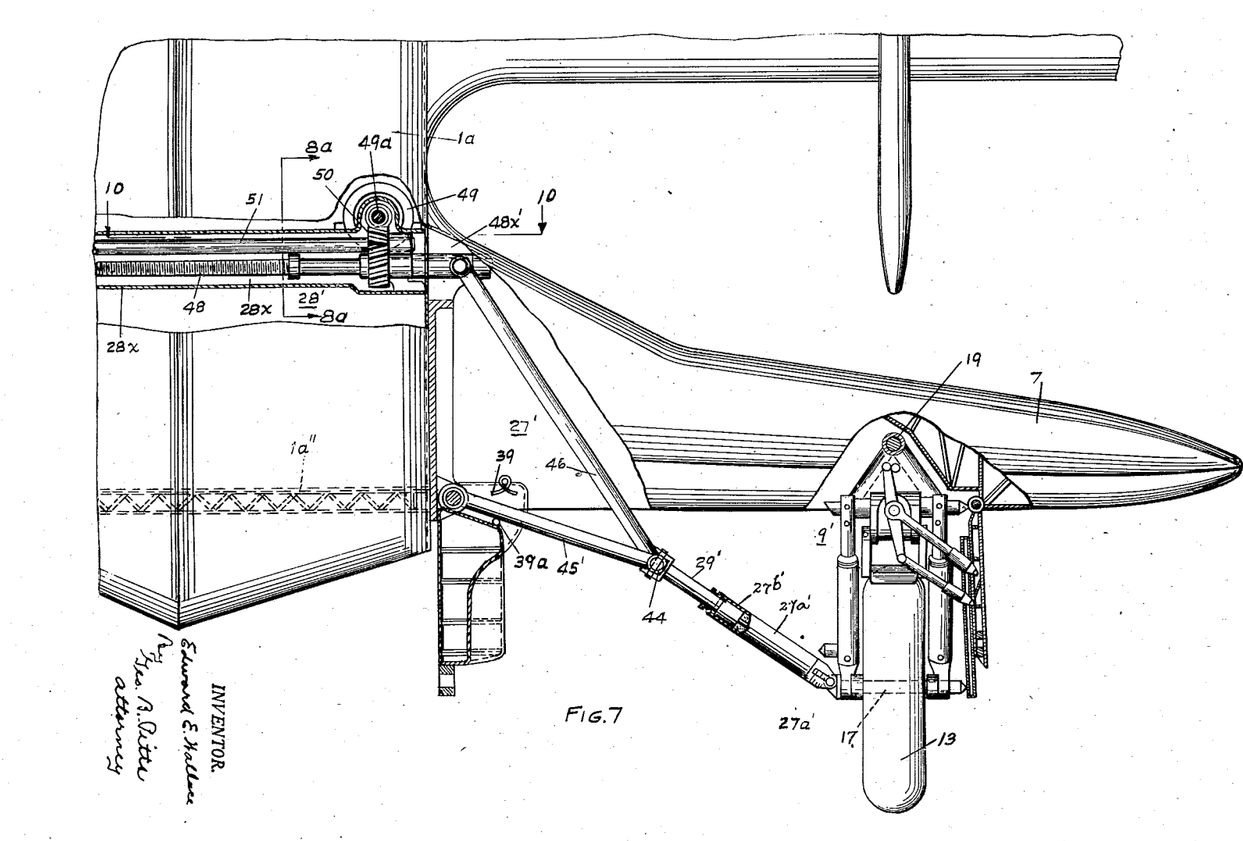
Fig. 7 is a view similar to Fig. 1, but showing a modified form of construction.
Figures 8, 8A, 9:
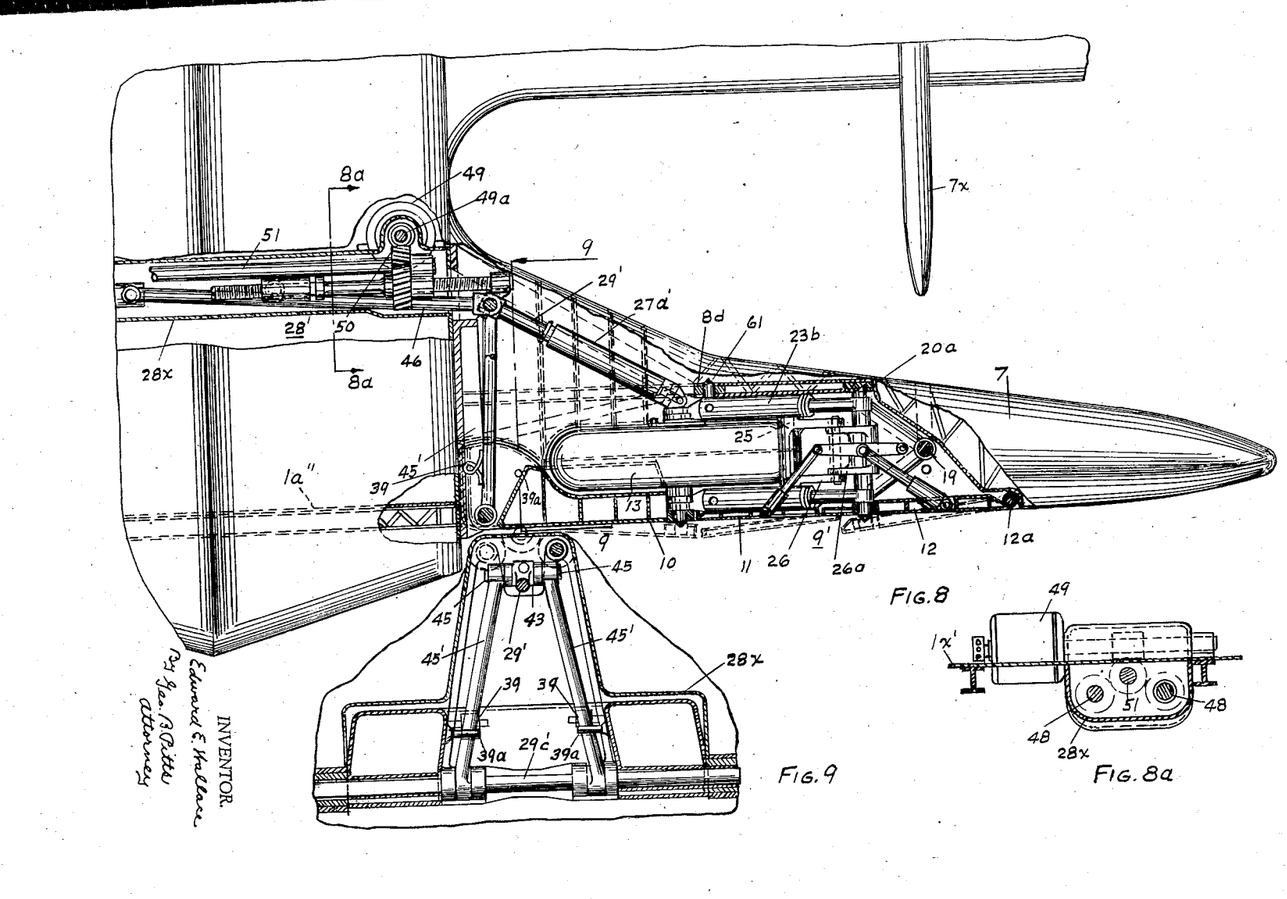
Fig. 8 is a view similar to Fig. 7, with the walls of the fuselage and sponson broken away to show the landing gear in retracted position and the power mechanism therefor.
Fig. 8a is a section on the line 8a—8a of Fig. 8.
Fig. 9 is a section on the line 9—9 of Fig. 8.
Figure 10:
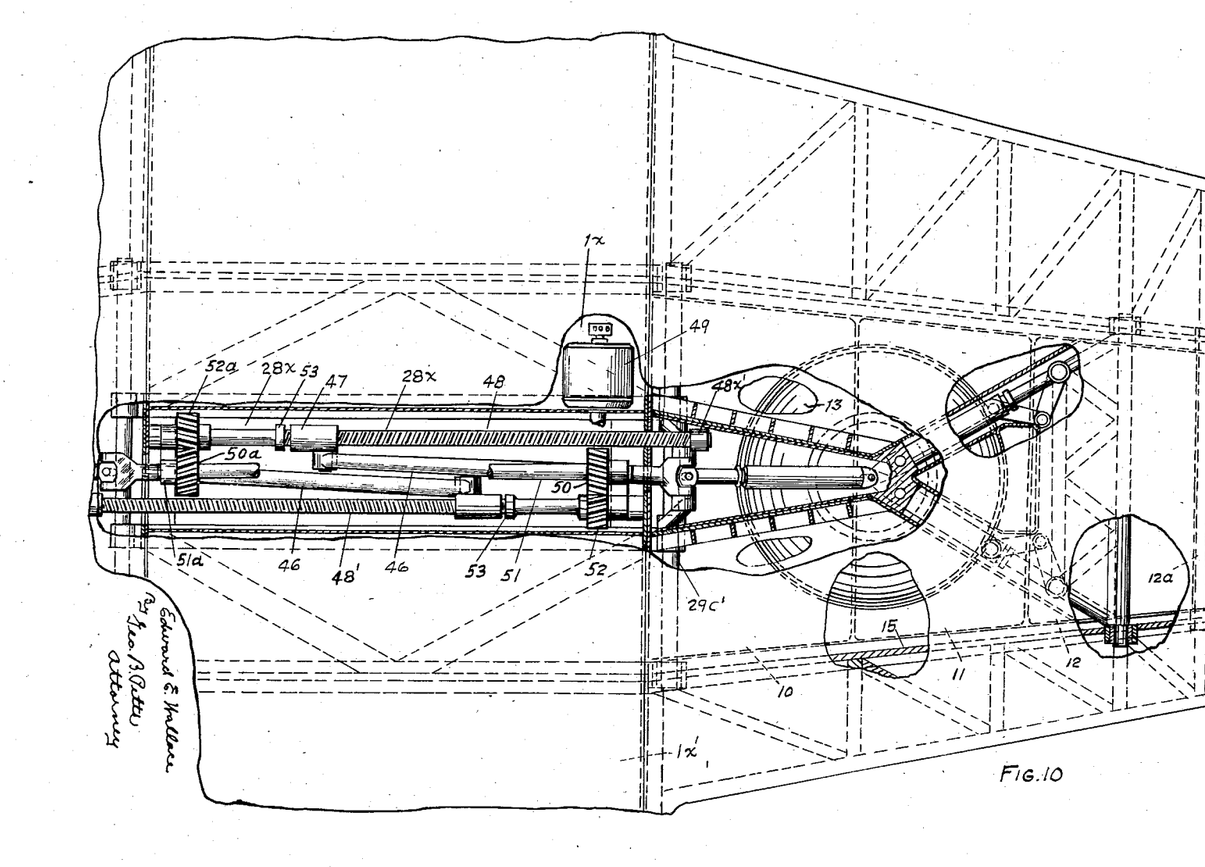
Fig. 10 is a bottom plan view of parts shown in Figs. 7 and 8, partly in section on the line 10—10 of Fig. 7.

In this connection it will be noted that the linkage, when in the position shown in Figs. 1, 2 and 7, forms a truss mounted on the adjacent side wall 1a' of the fuselage to provide a fixed support for the outer end of the compression devices (27a—29 in Fig. 1 and 27a'—29'' in Fig. 7) and the frame 18 forms a truss swingably mounted on the shaft 19, which is supported by the sponson spars 15. In this arrangement the truss 18, wheel 13 and mounting 9' for the latter permit lateral bodily movement of the airplane relative to the ground (see Figs. 11b to 14b, inclusive), that is, the point or points of contact of the wheel with the ground, which movement is yieldingly retarded and re-bound prevented by the compression devices 27x. Also, as noted, the wheel 13 is connected to the truss 18 by front and rear pairs of compression devices 23a, 23b, pivotally connected thereto and the wheel axle 17, which forward and rearward pairs of devices are capable of differential or relative movement, to permit bodily movement of the airplane relative to the ground during a landing operation in various directions, namely, vertically or parallel to the fuselage or both vertically and parallel to the fuselage as shown in Figs. 11b to 14b, inclusive. As shown in these views, the compression devices 27x and pairs of compression devices 23a—23b operate separately or conjointly in each landing operation, to resist or retard downward and/or forward movement of the airplane dependent on its horizontal or inclined relation to the ground at the time one wheel or both wheels make contact therewith. Accordingly, it will be seen that by connecting the wheel through the compression devices within and between two fixed points of support, namely, the universal joint (29a in Fig. 1 or joint 44 in Fig. 7) and the shaft 19, forces, due to the momentum and weight of the airplane and its load, if any, transmitted through the wheel to the landing surface in any direction or the resultant of components of forces in two or more directions, will be adequately yieldingly resisted and abnormal re-bound prevented. As diagrammatically shown in Figs. 11b to 14b, inclusive, the shaft 19 and universal joint 29a have a fixed relation in all positions of the compression devices 27x, 23a—23b, from which it follows that in all landing operations the airplane bodily moves relative to the landing surface about the point or points of contact of the wheel 13 therewith vertically (as indicated at d in Fig. 15), horizontally (as indicated at e in Fig. 15) or both vertically and horizontally.

Figure 11:
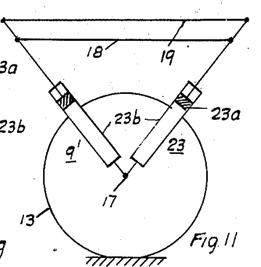
Figs. 11 to 14, inclusive, are diagrammatic of the mounting for a landing gear wheel showing various positions thereof in making landings.
Figure 11A:
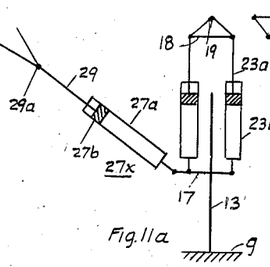
Figure 11B:
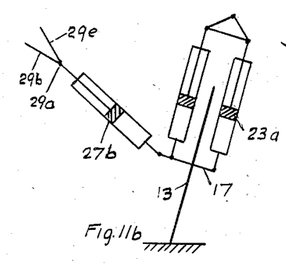
Figures 12, 12A:
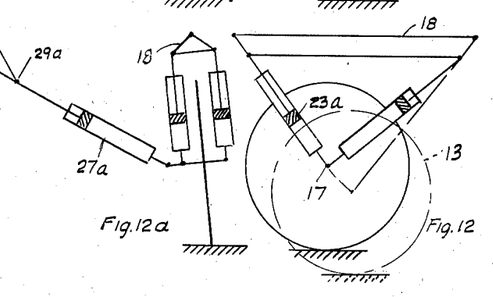
Figure 12B:
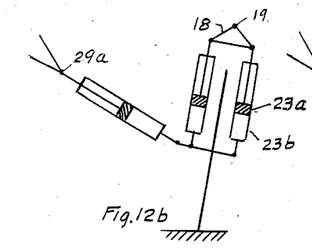
Figure 13:
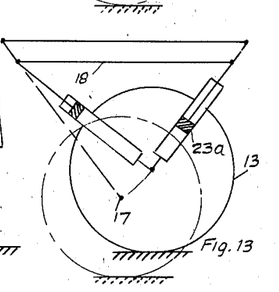
Figure 13A:
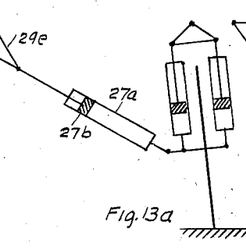
Figure 13B:
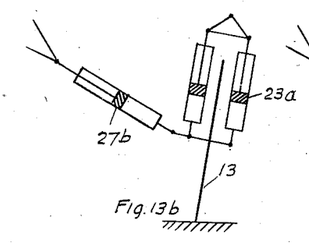
Figure 14:
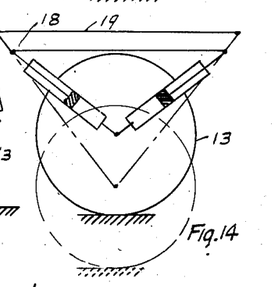
Figure 14A:
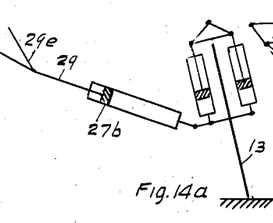
Figure 14B:
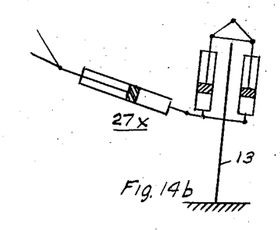
Figure 15:
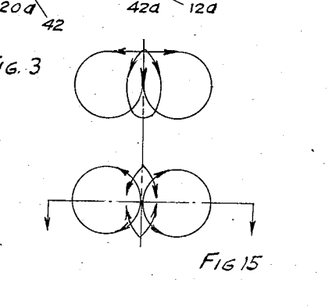
Fig. 15 is a diagram showing the movement of the airplane under varying landing conditions.

The movements above referred to will be understood from the diagrammatic views shown in Figs. 11 to 15, inclusive. In these views, Fig. 11 shows the wheel 13, mounting 9', truss 18 and shaft 19 in side elevation and Fig. 11a shows these parts and the compression devices 27x in front elevation, all in normal position with the wheel engaging the ground g. Fig. 11b shows a landing operation on one wheel wherein the pistons in the front and rear members 23' and piston 27b have been forced downwardly substantially equal distances. Figs. 12 and 12a illustrate a landing operation where the pistons 23a for the forward members 23' are forced downwardly whereas the pistons 23a for the rearward members 23' remain in normal position. Fig. 12b illustrates a condition wherein the devices 23' are positioned as shown in Fig. 12, but the piston 27b has been forced downwardly. In Fig. 12 the pistons for the forward devices 23' are in normal position whereas the pistons in the rearward devices 23' have been forced downwardly. In Fig. 13a, the pistons 23a have been forced downwardly, whereas the piston 27b remains in normal position. Fig. 14 shows a condition where all of the pistons 23a have been forced downwardly. Fig. 14a shows a condition where the pistons 23a are forced downwardly as shown in Fig. 14 and piston 27b remains in normal position, whereas Fig. 14b shows a condition similar to that in Fig. 14a except that the piston 27b has been forced downwardly.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In an airplane, the combination with a fuselage having at opposite sides thereof wing structures each consisting of an airfoil and a sponson formed with a compartment, of a shaft mounted in said compartment transversely of the adjacent sponson, a landing gear consisting of a wheel, a frame swingable about said shaft and resilient supporting means between the axle for said wheel and said frame, and means for swinging said landing gear about said shaft, said swinging means consisting of a power mechanism having a thrust member movable in the plane coincident with the axle for said wheel and linkage between said thrust member and the axle for said wheel and swingable in said plane, said linkage being co-operable with said shaft to support said landing gear in said compartment and operable to swing it to operative position, one of the links of said linkage consisting of resiliently related elements.

2. In an airplane, the combination with a fuselage having at opposite sides thereof wing structures, each consisting of an airfoil and a sponson, said fuselage and sponson being formed with alined connected compartments, of a shaft longitudinally mounted in the compartment in said sponson, a separate shaft mounted on the adjacent side wall of said fuselage in parallel relation to said first mentioned shaft, a landing gear fitting into the compartment in said sponson and consisting of a frame swingably mounted on said first mentioned shaft and a wheel mounted in said frame, power means including a feed screw mounted in the compartment of said fuselage and a nut threaded on said screw, a pair of spaced links mounted at their inner ends on said separate shaft, and linkage pivotally connected to said nut, the outer ends of said spaced links and the axle for said wheel arranged to be operated by said power means to swing said landing gear from the compartment in said sponson into operative position and in the opposite direction.

3. An airplane as claimed in claim 2 wherein resiliently related devices are interposed between said linkage and the axle for said wheel.

4. In an airplane, the combination with a fuselage having at opposite sides thereof wing structures each formed with a compartment, of a shaft transversely mounted in said compartment, a landing gear consisting of a wheel, a truss swingably mounted on said shaft and resilient supporting means between the opposite ends of the axle for said wheel and adjacent sides of said truss, and means for swinging said landing gear about said shaft, said swinging means comprising a power mechanism and linkage between said power means and the axle for said wheel and co-operable with said shaft to support said landing gear in said compartment and operable to swing it to operative position, said linkage consisting of relatively movable compression devices the outer one of which has a universal joint connection at its outer end with the inner end of the axle for said wheel, upper and lower links swingable relative to said fuselage and each other on axes parallel to said shaft, a universal joint for connecting the outer ends of said links and the inner end of the other compression device together and an operating connection between the upper link and said power means, said upper and lower links forming a truss when said landing gear is moved into operative position.

5. In an airplane, the combination with a fuselage having at opposite sides thereof wing structures each formed with a compartment, of a shaft transversely mounted in said compartment, a landing gear consisting of a wheel, a truss swingably mounted on said shaft and resilient supporting means between the opposite ends of the axle for said wheel and adjacent sides of said truss, and means for swinging said landing gear about said shaft, said swinging means comprising a power mechanism and linkage between said power means and the axle for said wheel and co-operable with said shaft to support said landing gear in said compartment and operable to swing it to operative position, said linkage consisting of relatively movable compression devices the outer one of which has a universal joint connection at its outer end with the inner end of the axle for said wheel, a lower link pivotally mounted at its inner end on said fuselage to swing on an axis parallel to said shaft, an upper link pivotally connected at its inner end to an element of said power means and a universal joint for connecting the outer ends of said links and the inner end of the other compression device together, said upper and lower links forming a truss when said landing gear is moved into operative position.

6. In an airplane, the combination with a fuselage having at opposite sides thereof wing structures each formed with a compartment, of a shaft transversely mounted in said compartment, a landing gear consisting of a wheel, a truss swingably mounted on said shaft and resilient supporting means between the opposite ends of the axle for said wheel and adjacent sides of said truss, and means for swinging said landing gear about said shaft, said swinging means comprising a power mechanism and linkage between said power means and the axle for said wheel and cooperable with said shaft to support said landing gear in said compartment and operable to swing it to operative position, said linkage consisting of relatively movable compression devices the outer one of which has a universal joint connection at its outer end with the inner end of the axle for said wheel, a lower link pivotally mounted on said fuselage on an axis parallel to said shaft, inner and outer pivotally connected link elements, the outer end of the inner element being pivotally mounted on said fuselage on an axis parallel to said shaft, a universal joint for connecting the outer ends of said link and outer element and inner end of the other compression device together and a link for connecting an element of said power means to one of said link elements, said link and said link elements forming a truss when said landing gear is moved into operative position.

7. In an airplane, the combination with a fuselage having at opposite sides thereof wing structures each formed with a compartment, of a shaft transversely mounted on the side wall of said fuselage, a separate shaft parallel to said first mentioned shaft transversely mounted in said compartment, a landing gear comprising a truss mounted on said separate shaft, a wheel, pairs of compression devices on opposite sides of said wheel and connected to the opposite ends of the axle therefor and opposite ends of said truss for supporting said wheel on said truss in a plane cutting the axis of said separate shaft, compression elements the outer one of which has a universal joint connection with the inner end of the wheel axle and a truss between said fuselage and the outer end of the other compression element and connected to the latter by a universal joint, the last mentioned truss consisting of a linkage, one link thereof being mounted on said first mentioned shaft, and power means connected to another link of said linkage for operating the latter to swing said landing gear into said compartment.

8. In an airplane, the combination with a fuselage having at opposite sides thereof wing structures each formed with a compartment, a shaft in said compartment disposed transversely of the adjacent wing structure, a truss swingably mounted on said shaft, a separate truss mounted on the side wall of said fuselage, a landing wheel, pairs of compression devices between the axle of said wheel and said first mentioned truss, compression devices between and having universal joint connection with the inner end of the wheel axle and said separate truss, said compression devices providing for movements of said wheel vertically, laterally and transversely relative to the adjacent wing structure, said separate truss consisting of a linkage swingable in a plane at right angles to said shaft, and power means connected to one link of said linkage for operating it to swing said wheel into said compartment.

EDWARD E. WALLACE.

REFERENCES CITED

The following references are of record in the file of this patent:

UNITED STATES PATENTS

| Number | Name | Date |
|---|---|---|
| 1,874,570 | Minshall | Aug. 30, 1932 |
| 2,187,040 | Laddon et al. | Jan. 16, 1940 |
| 1,968,637 | Dornier | July 31, 1934 |
| 1,718,189 | Baumann | June 18, 1929 |
| 2,220,546 | Saulnier | Nov. 5, 1940 |
| 1,866,534 | Janin | July 12, 1932 |
| 2,115,701 | Baer et al. | May 3, 1938 |
| 1,890,553 | Young | Dec. 13, 1932 |

FOREIGN PATENTS

| Number | Country | Date |
|---|---|---|
| 819,026 | France | June 28, 1937 |